United States Patent

[11] 3,536,129

| [72] | Inventor | Jerome R. White<br>San Carlos, California |
|---|---|---|
| [21] | Appl. No. | 776,952 |
| [22] | Filed | Nov. 19, 1968 |
| [45] | Patented | Oct. 27, 1970 |
| [73] | Assignee | Varian Associates<br>Palo Alto, California<br>a corporation of California |

[54] METHOD FOR THAWING FROZEN WATER-BEARING SUBSTANCES UTILIZING MICROWAVE ENERGY
2 Claims, 1 Drawing Fig.

[52] U.S. Cl.................................................. 165/2,
165/17, 165/30, 62/38, 219/10.55
[51] Int. Cl........................................................ F25b 13/00
[50] Field of Search.......................................... 165/1, 2,
29, 30, 17; 62/78; 219/10.55

[56] References Cited
UNITED STATES PATENTS
3,470,942  10/1969  Fukada et al. ................. 165/30

*Primary Examiner*— Charles Sukalo
*Attorney*—Stanley Z. Cole

ABSTRACT: A method for thawing frozen water-bearing substances is disclosed. In the method, a frozen water-bearing substance to be thawed, such as food, drugs or the like, is supported within a thawing zone of a microwave applicator. Microwave energy is applied to the frozen substance to elevate the temperature thereby forming a thawed zone within the substance being thawed. The outer surface of the frozen substance is maintained at a subfreezing temperature by cooling the support or by immersing the substance being thawed in a subfreezing environment to prevent formation of a premature melted zone at the outer surface of a substance being thawed. Application of microwave energy to the substance may be continued to the extent necessary to cause the thawed zone to expand from the inside toward the outside of the substance. By maintaining the outer surface in a frozen state, microwave energy is not strongly absorbed at the outer surface which would otherwise tend to shield the interior portion of the substance from the applied microwave energy and to overheat the outer portion.

Patented Oct. 27, 1970 3,536,129
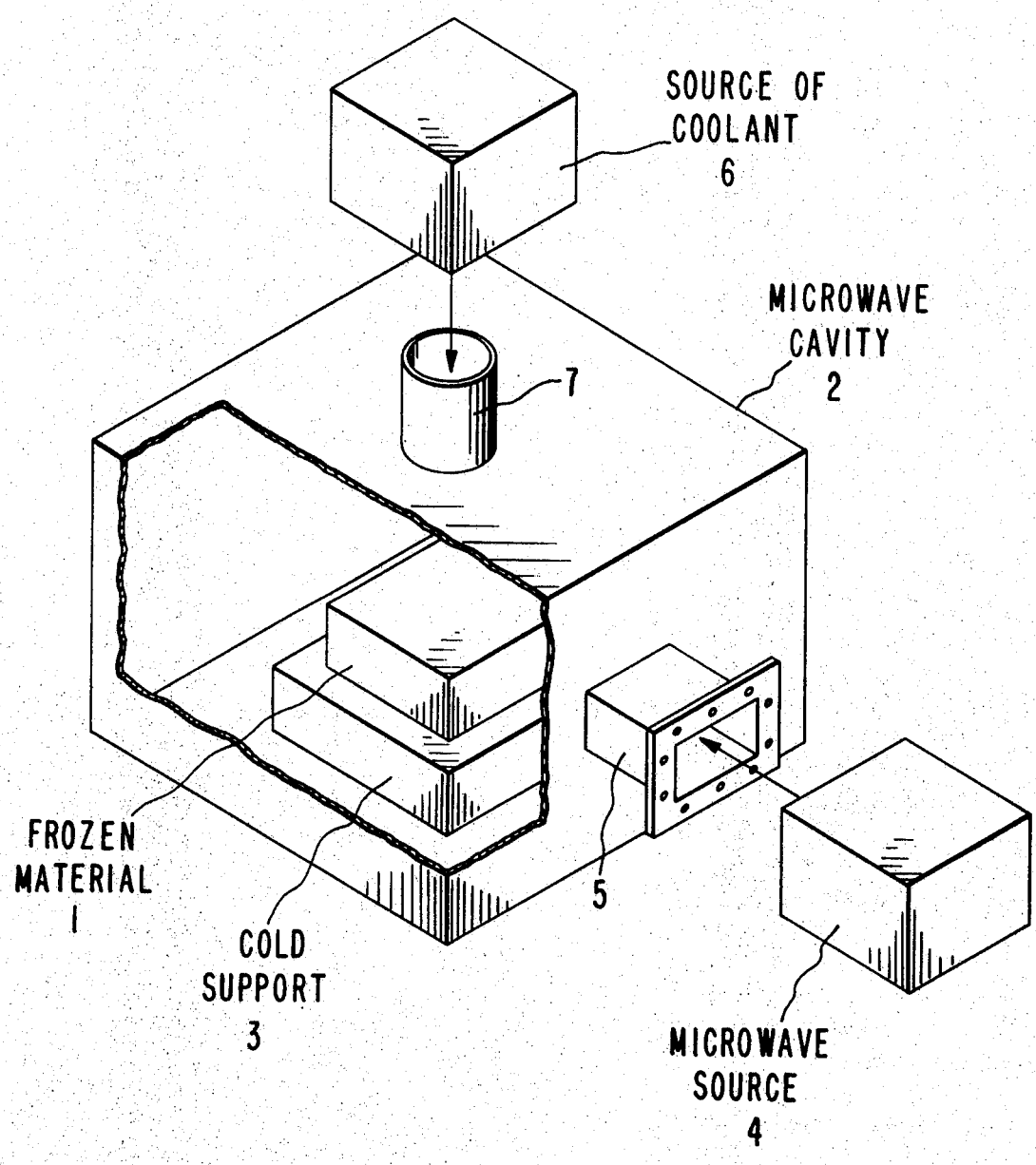
INVENTOR.
JEROME R. WHITE
BY Robert W. Delta
ATTORNEY

METHOD FOR THAWING FROZEN WATER-BEARING SUBSTANCES UTILIZING MICROWAVE ENERGY

DESCRIPTION OF THE PRIOR ART

Heretofore, it has been proposed to thaw large blocks of frozen goods, such as fish, vegetables and the like, by placing the block of frozen food in a microwave applicator and applying microwave energy to the frozen block to cause microwave heating of the block to produce thawing thereof. The problem with this method for thawing relatively large blocks of food is that the block begins to thaw from the outside. The thawing initially occurs on the outside of the block due to heating of the block from the ambient atmosphere or from the support structure that supports the block within the microwave applicator and also because any absorption causes the surface to be in the strongest microwave field. The problem is self-aggravating and the use of hot air as taught in U.S. Pat. 3,056,877 issued Oct. 2, 1962 only makes matters worse because a sheet of liquid water forms on the outside of the block and the absorptive characteristic of the liquid water is much greater than that of the frozen water. As a result, the melted zone absorbs more of the microwave energy tending to shield the interior of the block from the microwave energy. It turns out that the half power depth in liquid water at S-band microwave frequency is approximately one-half an inch. Thus, when a melted zone one-half inch or more in thickness forms on the outside of the block one-half or more of the power is absorbed in the melted zone and does not reach the frozen interior where it is actually needed. As a result it becomes difficult to thaw relatively large blocks of frozen water-bearing substance utilizing microwave energy in the aforementioned prior art method. Also, the absorption of microwave energy in the melted zone at the outside surface of the block can cause overheating and even cooking at the outside of the block, whereas the interior of the block remains frozen.

In prior methods for freeze drying water-bearing substances, microwave energy has been applied to frozen material while recirculating a subfreezing dry gas over the material. In this manner, frozen moisture in the material was sublimed into the stream of dry gas and thus, removed from the frozen material for dehydrating same. Such a prior method is disclosed in U.S. Pat. 3,270,428 issued Sept. 6, 1966. However, that prior process, while employing similar apparatus and method steps to those of the present invention, is directed to a method for drying a material, as contrasted with a method for thawing frozen material and is distinguishable from a method of thawing by the use of dehumidifier apparatus for removing the sublimed moisture from the subfreezing gas stream and by the regulation of the applied microwave energy to prevent thawing of the frozen material.

SUMMARY OF THE PRESENT INVENTION

The principle object of the present invention is the provision of an improved method for thawing frozen water-bearing substances utilizing microwave energy.

One feature of the present invention is the provision, in a method for thawing frozen water-bearing substances by application of microwave energy, of the step of maintaining the outer surface of the frozen substance at subfreezing temperatures while applying the microwave energy, whereby the frozen material is thawed from the inside toward the outside.

Another feature of the present invention is the same as the preceding feature wherein the step of maintaining the outer surface of the substance at subfreezing temperature includes the step of immersing the substance in a low loss tangent dielectric coolant having a temperature below 32°F, such coolants including, for example, low loss tangent solids, liquids and gases.

Another feature of the present invention is the same as any one or more of the preceding features wherein the amplitude of the microwave energy, as applied to the frozen substance to be thawed, is periodically interrupted with the interruptions being of a duration on the order of the thermal time constant of heat flow through the distance separating frozen or thawed zones, whereby temperature smoothing is obtained to reduce spotty thawing.

Other features and advantages of the present invention will become apparent upon a perusal of the following specification taken in connection with the accompanying drawings.

BRIEF DESCRIPTION OF THE DRAWING

The drawing is a schematic line diagram, partly in block diagram form, depicting a microwave applicator as employed in practicing the method of the present invention.

DESCRIPTION OF THE PREFERRED EMBODIMENTS

Referring to the drawing, there is shown an apparatus for practicing the method of the present invention. More specifically, a block 1 of frozen water-bearing substance to be thawed, such as meat, fish, vegetables, drugs, etc., is placed within a microwave cavity 2 on a suitable refrigerated support structure 3. The block 1 of frozen material may have any one of a number of different shapes and sizes but typically, in the case of meats, fish and vegetables the block 1 has a length of approximately 4 feet, a width of approximately 2 feet and a thickness of approximately 4 to 6 inches.

Microwave energy is applied to the microwave cavity 2 from a suitable source of microwave energy 4, such as a magnetron, which is coupled to the cavity via suitable waveguide plumbing 5. The microwave energy excites a resonant field in the cavity for applying microwave energy to the block 1 of frozen material. Concurrently, a subfreezing coolant is supplied to the outside of the frozen block 1 for maintaining the outer surface of the block 1 at a subfreezing temperature. A suitable subfreezing coolant includes both solids and fluids and the fluids may be gaseous or liquid. The subfreezing coolant is supplied from a source of coolant 6 via an inlet pipe 7. Examples of subfreezing fluid coolant includes; subfreezing gases, such as air, nitrogen, argon, etc.; subfreezing liquids, such as liquified gases, hydrocarbons, such as propane or butane and nonpolar halogenated hydrocarbons such as certain organic compounds containing one to four carbon atoms and fluorine such as $CClF_2$–$CClF_2$, commonly known as Freon 114. A suitable liquified gas is nitrogen. A suitable solid coolant would be soldified gases such as frozen carbon dioxide. The coolant should preferably have a loss tangent less than the loss tangent of ice which is 0.0009 at S-band. As used herein, "low loss tangent coolant is defined to mean a loss tangent less than 10 times the loss tangent of ice or in other words a loss tangent less than 0.01".

As an alternative to providing a coolant medium in which the frozen material 1 is immersed, the sidewalls of the cavity or other support structure may be refrigerated to maintain the outer surface of the block of material 1 in the frozen state.

In operation, the microwave energy passes into the frozen material and is absorbed within the interior thereof causing a zone within the interior of the block 1 to have its temperature elevated sufficiently to thaw and thus tend to transform some of the frozen material from the solid phase to the liquid phase. Thus, there is formed a liquid/solid phase zone within the substance being thawed. Once the liquid water is formed within the frozen block 1, the water has a much higher loss tangent than that of the ice which surrounds it. More specifically, the loss tangent for water at 1.5°C. is 0.31 and it has a dielectric constant of 80.5, whereas the loss tangent for ice is 0.0009 and it has a dielectric constant of 3.2. Thus, the liquid/solid phase zone within the frozen block 1 absorbs more of the microwave energy and causes the liquid/solid phase zone to expand from the inside toward the outside of the block 1. By maintaining the outer surface of the block 1 at subfreezing temperature, the interior of the block is not shielded by absorption of energy in the liquid phase zone that would otherwise be formed on the outside surface of the block. In this manner, the time required to thaw a block of frozen food or the like is substantially reduced and, in the process, the outside portion of the block is not cooked or overheated in order to thaw the interior of the block.

In some cases, due to inhomogeneities in the composition of the frozen block 1 and/or variations in the intensity of the microwave field within the cavity, spotty thawing may occur. In other words, a number of spatially separated thawed zones may occur within the interior of the frozen block. In most cases, spotty thawing would not be troublesome as the thawed regions would merely expand to join one another during the thawing process. However, in case spotty thawing is detrimental it can be largely overcome by periodically interrupting the application of the microwave energy. The duration of the interruptions should be on the order of the thermal time constant of heat flow through the distance separating frozen or thawed zones. This would range from 10 minutes to 2 hours or more, typically one-half hour to three-quarters of an hour. By interrupting the application of the microwave energy in the aforementioned manner, a substantial temperature smoothing occurs which avoids the spotty thawing condition.

In most cases it will be desirable to prevent dehydration of the outer surface of the block 1 being thawed. Accordingly, the coolant, in case it is a subfreezing fluid, should be moisture-saturated such that it will not pick up additional moisture, as by sublimation, from the surface of the block 1.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In a method of thawing frozen water-bearing substances by use of microwave energy the steps of, supporting the frozen substance with a support structure in a thawing zone, applying microwave energy to the frozen substance to elevate the temperature of the interior of the substance sufficiently to thaw the same, and simultaneously encompassing said frozen substance with a substantially moisture-saturated subfreezing fluid coolant to both maintain the outer surface of the frozen substance at a subfreezing temperature and to inhibit sublimation of moisture from the frozen substance and consequent dehydration thereof.

2. The method of claim 1 including the support structure for the substance being thawed to below 32°F. simultaneously with said application of microwave energy.